(12) United States Patent
Chung et al.

(10) Patent No.: US 11,436,424 B2
(45) Date of Patent: Sep. 6, 2022

(54) RFID-BASED SENSING METHOD AND SYSTEM

(71) Applicant: City University of Hong Kong, Kowloon (HK)

(72) Inventors: Shu Hung Henry Chung, Mid-Levels (HK); Xu Zhang, Foshan (CN); Han-Xiong Li, Kowloon (HK)

(73) Assignee: City University of Hong Kong, Kowloon (HK)

( * ) Notice: Subject to any disclaimer, the term of this patent is extended or adjusted under 35 U.S.C. 154(b) by 65 days.

(21) Appl. No.: 17/151,865

(22) Filed: Jan. 19, 2021

(65) Prior Publication Data

US 2022/0237393 A1 Jul. 28, 2022

(51) Int. Cl.
*G06K 7/08* (2006.01)
*G06K 7/10* (2006.01)
*G06K 19/07* (2006.01)

(52) U.S. Cl.
CPC ..... *G06K 7/10366* (2013.01); *G06K 19/0723* (2013.01)

(58) Field of Classification Search
CPC ............ G06K 7/10366; G06K 19/0723
See application file for complete search history.

(56) References Cited

U.S. PATENT DOCUMENTS 10,878,685 B1 * 12/2020 Diorio ................ G06K 7/10366

OTHER PUBLICATIONS

G. Marrocco, "RFID grids: Part 1—Electromagnetic theory," IEEE Transactions on Antennas and Propagation, vol. 59, No. 3, pp. 1019-1026, 2011.
J. Grosinger, L. Gortschacher, and W. Bosch, "Passive RFID sensor tag concept and prototype exploiting a full control of amplitude and phase of the tag signal," IEEE transactions on microwave theory and techniques, vol. 64, No. 12, pp. 4752-4762, 2016.
S. Kim, Y. Kawahara, A. Georgiadis, A. Collado, and M. M. Tentzeris, "Low-cost inkjet-printed fully passive RFID tags for calibration-free capacitive/haptic sensor applications," IEEE Sensors Journal, vol. 15, No. 6, pp. 3135-3145, 2014.
S. Caizzone, E. Di Giampaolo, and G. Marrocco, "Setup-independent phase-based sensing by UHF RFID," IEEE Antennas and Wireless Propagation Letters, vol. 16, pp. 2408-2411, 2017.
L. J. Gortschacher and J. Grosinger, "UHF RFID Sensor System Using Tag Signal Patterns: Prototype System," IEEE antennas and wireless propagation letters, vol. 18, No. 10, pp. 2209-2213, 2019.

* cited by examiner

*Primary Examiner* — Jamara A Franklin
(74) *Attorney, Agent, or Firm* — Renner Kenner Greive Bobak Taylor & Weber

(57) ABSTRACT

An RFID-based sensing method including receiving, from an RFID tag with a tuning circuit when the tuning circuit is arranged in a first state, a first RF signal; and receiving, from the RFID tag when the tuning circuit is arranged in a second state, a second RF signal. The tuning circuit is arranged to affect or facilitate impedance matching of an antenna and an integrated circuit of the RFID tag. The method also includes processing the first and second RF signals received to determine respective differences in two or more properties of the first and second RF signals received; and determining, based on the processing, a status associated with an environment in which the RFID tag is arranged.

29 Claims, 16 Drawing Sheets

RFID-BASED SENSING METHOD AND SYSTEM

TECHNICAL FIELD

The invention relates to a RFID-based sensing method and system.

BACKGROUND

Radio frequency identification (RFID) technology is a promising way to provide cost-effective sensing capabilities, e.g., in Internet-of-Things (IoT) applications.

Referring to FIG. 1, a typical RFID system 100 includes a RFID reader 102 and a RFID tag 104 arranged to communication with the RFID reader 102. The RFID reader 102 is arranged to transmit a RF signal to the RFID tag 104 to trigger a responsive RF signal from the RFID tag 104. The responsive RF signal contains information associated with the RFID tag 104 or an object to which the RFID tag 104 is attached. The RFID reader 102 receives and processes the responsive RF signal and extracts useful information from it for sensing.

Some existing RFID tags used as RFID tag sensors include transducer-integrated antennas. The transducers in these tags may change the electromagnetic properties (such as permittivity and conductivity) of the antenna or may physically deform the antenna to vary the gain and impedance of the antenna. By detecting the responsive RF signal from the RFID tag sensor, the RFID reader can extract sensed information associated with the RFID tag sensor from the responsive RF signal. A problem associated with this approach is that it requires frequent calibration. This is because the analog characteristics of responsive RF signal relies on not only antenna characteristics but also on the measurement setup (such as the mutual distance and orientation between RFID tag and the RFID reader, and line-of-sight obstruction). The multi-path channel between the RFID tag and the RFID reader may also affect the analog feedback received at the RFID reader.

Efforts have been made to reduce the effect of the measurement setup on the sensing application, or, more generally, to advance RFID-based sensing applications.

G. Marrocco, "*RFID grids: Part I—Electromagnetic theory,*" IEEE Transactions on Antennas and Propagation, vol. 59, no. 3, pp. 1019-1026, 2011 discloses an analog identifier (AID) based approach. In this approach, the RFID reader gradually increases the power level of the transmitted signal until the RFID tag is activated (e.g., until a responsive RF signal is received from the RFID tag). The AID is then calculated by the latest power level and RFID tag's read sensitivity (i.e., the minimal input power of activating tag to answer QUERY command, which is available in the RFID tag datasheet). However, the AID approach sacrifices communication performance in partial sensing states.

S. Kim, Y. Kawahara, A. Georgiadis, A. Collado, and M. M. Tentzeris, "*Low-cost inkjet-printed fully passive RFID tags for calibration-free capacitive/haptic sensor applications*" IEEE Sensors Journal, vol. 15, no. 6, pp. 3135-3145, 2014 and S. Caizzone, E. Di Giampaolo, and G. Marrocco, "*Setup-independent phase-based sensing by UHF RFID*" IEEE Antennas and Wireless Propagation Letters, vol. 16, pp. 2408-2411, 2017 disclose a double phase difference (DPD) approach. In this approach, an environment-insensitive RFID tag as a reference RFID tag. The phase difference between reference RFID tag and the RFID tag sensor is a calibration-free sensing indicator. The reference RFID tag, however, introduces additional hardware cost and enlarges the physical size of the set-up.

M. C. Caccami and G. Marrocco, "*Electromagnetic modeling of self-tuning RFID sensor antennas in linear and nonlinear regimes*" IEEE Transactions on Antennas and Propagation, vol. 66, no. 6, pp. 2779-2787, 2018; K. Zannas, H. El Matbouly, Y. Duroc, and S. Tedjini, "*Self-tuning RFID tag: A new approach for temperature sensing*" IEEE Transactions on Microwave Theory and Techniques, vol. 66, no. 12, pp. 5885-5893, 2018; and I. Ullah, R. Horne, B. Sanz-Izquierdo, and J. C. Batchelor, "*RFID AC Current Sensing Technique*" IEEE Sensors Journal, 2019 digitize the dynamic of antenna impedance with a readable self-tuning value (an output of a self-tuning circuit in an integrated circuit (IC) of the RFID tag).

To provide a more consistent performance under various environment, some RFID tags incorporate a self-tuning circuit to automatically adjust the chip impedance in a small range. Examples of such RFID tags are illustrated in U.S. Ser. No. 13/345,654 and its continuation U.S. Ser. No. 14/586,876. In this case, the RFID reader may obtain the nearby environmental state of the RFID tag by reading the self-tuning value of RFID tag. However, the states of self-tuning circuit, hence the number of supportable sensing states, are usually limited.

SUMMARY

In a first aspect, there is provided a RFID-based sensing method. The method includes receiving, from an RFID tag with a tuning circuit arranged to affect impedance matching of an antenna and an integrated circuit of the RFID tag and when the tuning circuit is arranged in a first state, a first RF signal; and receiving, from the RFID tag when the tuning circuit is arranged in a second state, a second RF signal. The method also includes processing the first and second RF signals received to determine respective differences in two or more properties of the first and second RF signals received; and determining, based on the processing, a status associated with an environment in which the RFID tag is arranged. The RFID tag is arranged at substantially the same location when the first and second RF signals are received.

The utilization of differences in two or more properties of the first and second RF signals received in the determination of status associated with an environment in which the RFID tag may reduce if not substantially eliminate the effect of the set-up of the RFID tag and RFID reader (e.g., the distance and/or orientation between the RFID reader and the RFID tag) on the determination result. Also, when compared with the utilization of differences in only one property of the first and second RF signals received, the utilization of differences in two or more properties of the first and second RF signals received may enable differentiation of additional statuses associated with an environment in which the RFID tag is arranged.

The properties of the first RF signal may include, among others, phase of the first RF signal, power level (e.g., received signal strength indicator RSSI) of the first RF signal, and a first tuning parameter associated with the tuning circuit in the first state. The properties of the second RF signal may include, among others, phase of the second RF signal, power level (e.g., RSSI) of the second RF signal, and a second tuning parameter associated with the tuning circuit in the second state.

The processing may include determining a difference between the first and second tuning parameters; and determining one or both of: a difference between the power level (e.g., RSSI) of the first RF signal and the power level (e.g., RSSI) of the second RF signal, and a difference between the phase of the first RF signal and the phase of the second RF signal.

The processing may include determining, from the first RF signal: phase of the first RF signal, power level (e.g., RSSI) of the first RF signal, and a first tuning parameter associated with the tuning circuit in the first state; and determining, from the second RF signal: phase of the second RF signal, power level (e.g., RSSI) of the second RF signal, and a second tuning parameter associated with the tuning circuit in the second state.

The processing may include filtering, using a low-pass filter, a difference the phase of the first RF signal and the phase of the second RF signal.

The determining may include determining, based on predetermined mapping between differences in properties of the first and second RF signals received and statuses associated with the environment, the status associated with the environment in which the RFID tag is arranged.

In one embodiment, the tuning circuit is enabled (e.g., turned on) in one of the first state and the second state and is disabled (e.g., turned off) in another one of the first state and the second state. In this case, the differences in the properties of the first and second RF signals may be referred to as "on-off differential".

In one embodiment, the tuning circuit is arranged to provide a first impedance matching between the antenna and the integrated circuit in the first state and to provide a second impedance matching between the antenna and the integrated circuit in the second state.

The method may further include transmitting a signal to the RFID tag to cause the tuning circuit to change from the first state to the second state prior to receiving the second RF signal, optionally after the first RF signal is received.

The method may further include transmitting one or more signals to the RFID tag to trigger transmission of the first and second RF signals from the RFID tag.

The RFID tag may be a passive RFID tag. Or the RFID tag may be a semi-active RFID tag.

The RFID tag may be a UHF RFID tag, or it may be configured to operate in other frequency range(s).

The tuning circuit may be part of the integrated circuit. Or, it may be separately arranged from the integrated circuit.

The tuning circuit may be arranged to adjust an impedance of the integrated circuit to affect impedance matching of the antenna and the integrated circuit. In one embodiment, the tuning circuit is a variable capacitance/impedance circuit. The tuning circuit may be a self-tuning circuit arranged to facilitate (e.g., automatically adjust) impedance matching of the antenna and the integrated circuit.

In one application, the RFID tag is arranged to be attached to a liquid container or pipe, and the status associated with the environment in which the RFID tag is arranged includes a fill level of the liquid container or pipe to which the RFID tag is attached. The fill level of the liquid container or pipe may relate to blockage level of the liquid container or pipe. The liquid may be water, oil, chemicals, etc.

The method in the first aspect may be performed using preferably one, or more, RFID readers.

In a second aspect, there is provided a RFID-based sensing method. The method includes transmitting, from an RFID tag with a tuning circuit arranged to affect impedance matching of an antenna and an integrated circuit of the RFID tag to an RFID reader, a first RF signal when the tuning circuit is arranged in a first state; and transmitting, from the RFID tag to the RFID reader, a second RF signal when the tuning circuit is arranged in a second state. The first and second RF signals are arranged to be processed at the RFID reader to determine respective differences in two or more properties of the first and second RF signals and to determining a status associated with an environment in which the RFID tag is arranged.

The properties of the first RF signal may include, among others, phase of the first RF signal, power level (e.g., RSSI) of the first RF signal, and a first tuning parameter associated with the tuning circuit in the first state. The properties of the second RF signal may include, among others, phase of the second RF signal, power level (e.g., RSSI) of the second RF signal, and a second tuning parameter associated with the tuning circuit in the second state.

In one embodiment, the tuning circuit is enabled (e.g., turned on) in one of the first state and the second state and is disabled (e.g., turned off) in another one of the first state and the second state. In this case, the differences in the properties of the first and second RF signals may be referred to as "on-off differential".

In one embodiment, the tuning circuit is arranged to provide a first impedance matching between the antenna and the integrated circuit in the first state and to provide a second impedance matching between the antenna and the integrated circuit in the second state.

The method may further include receiving, from the RFID reader, a signal to cause the tuning circuit to change from the first state to the second state prior to receiving the second RF signal, optionally after the first RF signal is received.

The method may further include receiving, from the RFID reader, one or more signals to trigger transmission of the first and second RF signals.

The RFID tag may be a passive RFID tag. Or the RFID tag may be a semi-active RFID tag.

The RFID tag may be a UHF RFID tag, or it may be configured to operate in other frequency range(s).

The tuning circuit may be part of the integrated circuit. Or it may be separately arranged from the integrated circuit.

The tuning circuit may be arranged to adjust an impedance of the integrated circuit to affect impedance matching of the antenna and the integrated circuit. In one embodiment, the tuning circuit is a variable capacitance/impedance circuit. The tuning circuit may be a self-tuning circuit arranged to facilitate (e.g., automatically adjust) impedance matching of the antenna and the integrated circuit.

In one application, the RFID tag is arranged to be attached to a liquid container or pipe, and the status associated with the environment in which the RFID tag is arranged includes a fill level of the liquid container or pipe to which the RFID tag is attached. The fill level of the liquid container or pipe may relate to blockage level of the liquid container or pipe. The liquid may be water, oil, chemicals, etc.

In a third aspect, there is provided an RFID reader that is arranged to communicate with one or more RFID tags, sequentially or substantially simultaneously. The RFID reader includes an antenna arranged to: receive, from an RFID tag with a tuning circuit arranged to affect impedance matching of an antenna and an integrated circuit of the RFID tag and when the tuning circuit is arranged in a first state, a first RF signal; and receive, from the RFID tag with the tuning circuit arranged in a second state, a second RF signal. The RFID reader also includes a controller arranged to process the first and second RF signals received to determine respective differences in two or more properties of the first and second RF signals received; and determine, based on the processing, a status associated with an environment in which the RFID tag is arranged.

The properties of the first RF signal may include, among others, phase of the first RF signal, power level (e.g., RSSI) of the first RF signal, and a first tuning parameter associated with the tuning circuit in the first state. The properties of the second RF signal may include, among others, phase of the second RF signal, power level (e.g., RSSI) of the second RF signal, and a second tuning parameter associated with the tuning circuit in the second state.

The controller may be arranged to process the first and second RF signals to: determine a difference between the first and second tuning parameters; and determine one or both of: a difference between the power level (e.g., RSSI) of the first RF signal and the power level (e.g., RSSI) of the second RF signal, and a difference between the phase of the first RF signal and the phase of the second RF signal.

The controller may be arranged to process the first and second RF signals to: determine, from the first RF signal: phase of the first RF signal, power level (e.g., RSSI) of the first RF signal, and a first tuning parameter associated with the tuning circuit in the first state; and determine, from the second RF signal: phase of the second RF signal, power level (e.g., RSSI) of the second RF signal, and a second tuning parameter associated with the tuning circuit in the second state.

The controller may be arranged to filter, using a low-pass filter, a difference the phase of the first RF signal and the phase of the second RF signal.

The controller may be arranged to determine, based on predetermined mapping between differences in properties of the first and second RF signals received and statuses associated with the environment, the status associated with the environment in which the RFID tag is arranged.

In one embodiment, the tuning circuit is enabled (e.g., turned on) in one of the first state and the second state and is disabled (e.g., turned off) in another one of the first state and the second state. In this case, the differences in the properties of the first and second RF signals may be referred to as "on-off differential".

In one embodiment, the tuning circuit is arranged to provide a first impedance matching between the antenna and the integrated circuit in the first state and to provide a second impedance matching between the antenna and the integrated circuit in the second state.

The antenna may be arranged to transmit a signal to the RFID tag to cause the tuning circuit to change from the first state to the second state. The transmission may be prior to receiving of the second RF signal and optionally after receiving the first RF signal.

The antenna may be arranged to transmit one or more signals to the RFID tag to trigger transmission of the first and second RF signals from the RFID tag.

In a fourth aspect, there is provided a RFID-based sensing system including an RFID reader of the third aspect, and one or more RFID tags arranged to communicate with the RFID reader. The RFID tag(s) each include, respectively, an antenna, an integrated circuit coupled to the antenna, and the tuning circuit arranged to affect impedance matching of the antenna and the integrated circuit.

The RFID tag may be a passive RFID tag. Or the RFID tag may be a semi-active RFID tag.

The RFID tag may be a UHF RFID tag, or it may be configured to operate in other frequency range(s).

The tuning circuit may be part of the integrated circuit. Or it may be separately arranged from the integrated circuit.

The tuning circuit may be arranged to adjust an impedance of the integrated circuit to affect impedance matching of the antenna and the integrated circuit. In one embodiment, the tuning circuit is a variable capacitance/impedance circuit. The tuning circuit may be a self-tuning circuit arranged to facilitate (e.g., automatically adjust) impedance matching of the antenna and the integrated circuit.

In one application, the RFID tag is arranged to be attached to a liquid container or pipe, and the status associated with the environment in which the RFID tag is arranged includes a fill level of the liquid container or pipe to which the RFID tag is attached. The fill level of the liquid container or pipe may relate to blockage level of the liquid container or pipe. The liquid may be water, oil, chemicals, etc.

The RFID tag may include a flexible substrate on which the antenna and the integrated circuit are arranged. The flexible substrate may be attached to structure of different shapes and configurations.

In the above aspects, the term RFID tag and RFID tag sensor are used interchangeably to refer to RFID tags that can be used in sensing applications.

Other features and aspects of the invention will become apparent by consideration of the detailed description and accompanying drawings. Any feature(s) described herein in relation to one aspect or embodiment may be combined with any other feature(s) described herein in relation to any other aspect or embodiment as appropriate and applicable.

BRIEF DESCRIPTION OF THE DRAWINGS

Embodiments of the invention will now be described, by way of example, with reference to the accompanying drawings in which.

DETAILED DESCRIPTION

Figure 1:
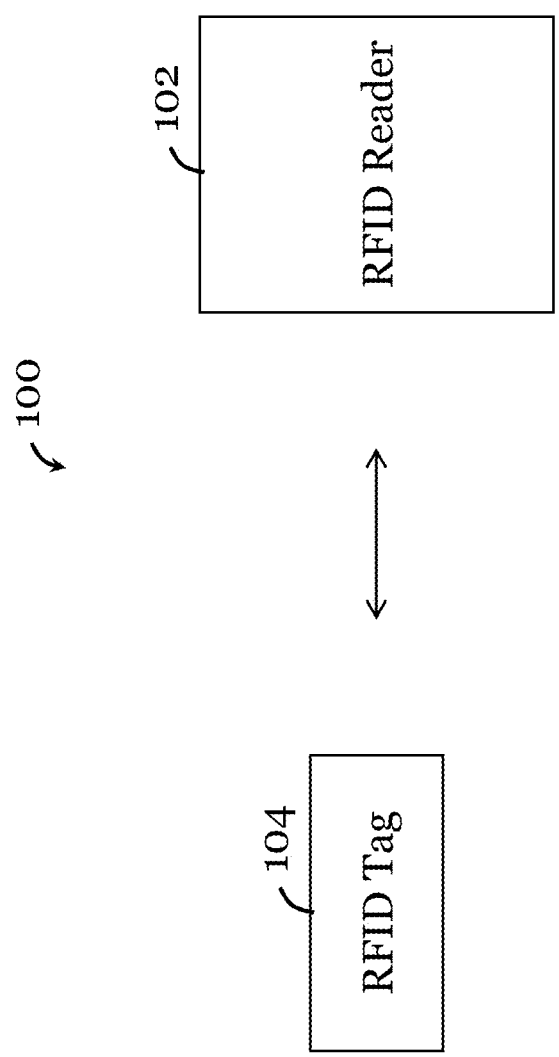
FIG. 1 is a schematic diagram of a typical RFID reader and tag system.
Figure 2:
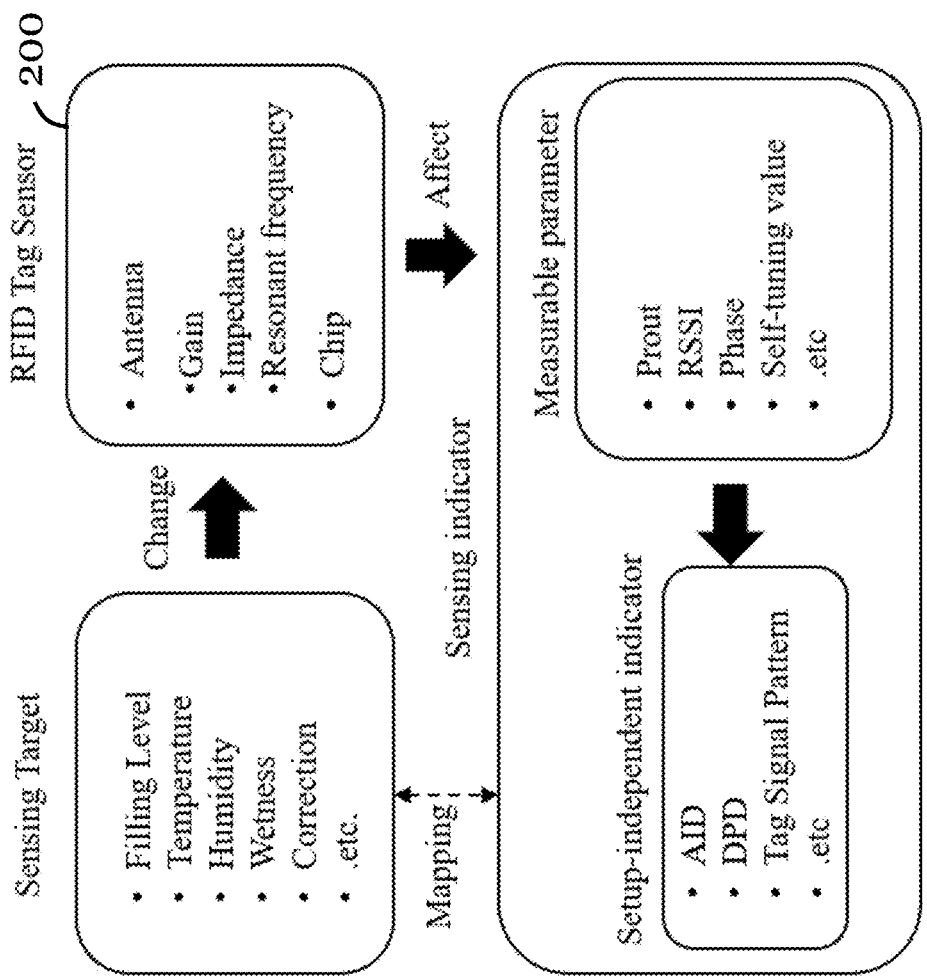
FIG. 2 is a schematic diagram of a RFID tag sensor system.

FIG. 2 illustrates a RFID tag sensor system. The RFID tag sensor 200 (or more generally the RFID tag) includes an RFID antenna and an RFID integrated circuit (e.g., chip). In this system, the environmental states (e.g., temperature, humidity, wetness, correction, filling level of a container or pipe to which the tag sensor 200 is attached, etc.) in which the RFID tag sensor 200 is arranged are the sensing targets. These sensing targets may affect the characteristics of the RFID antenna (such like gain, impedance and/or resonant frequency of the antenna) and hence may directly affect the state of the RFID integrated circuit. In operation, a RFIC reader radiates power $P_{rout}$ to the RFID tag sensor and collects phase and power level (e.g., RSSI) of the responsive signal (backscattered signal) from the RFID tag sensor, as well as self-tuning value of a tuning circuit associated with the integrated circuit. The phase, power level, and tuning values are used to construct the sensing indicator. Some exemplary sensing indicators that are generally independent of the measurement setup include AID, DPD, tag signal pattern, etc. A mapping between various levels of environmental states and various sensing indicator is built and is used for subsequent sensing applications using the RFID tag sensor 200.

Some of the measurable parameters are now described in greater detail.

In one embodiment the RFID tag sensor 200 can be characterized by its antenna gain $G_{tag}$, antenna impedance $Z_A = R_A + jX_A$, and integrated circuit (chip) impedance $Z_C = R_C + jX_C$. In this case, for a power wave $P_{rout}$ radiated by the antenna of the RFID reader with gain $G_{reader}$, the received power of RFID IC ($P_{tin}$) is given by the free-space Friis formulation:

$$P_{tin} = \left(\frac{\lambda}{4\pi d}\right)^2 P_{rout} G_{tag} G_{reader} \tau \quad (1)$$

where $\lambda$ is wave length, d is the tag-reader distance, and $\tau$ is power transfer coefficient. $\tau$ is calculated by equation (2) and represents the matching between the chip and antenna of the RFID tag:

$$\tau(Z_A, Z_C) = \frac{4R_C R_A}{|Z_C + Z_A|^2} \quad (2)$$

The power of backscattered signal (from the RFID tag) received at RFID reader ($P_{rin}$) can be given by free-space Friis formulation where $\eta$ is the tag backscatter efficiency:

$$P_{rin} = \left(\frac{\lambda}{4\pi d}\right)^2 P_{tin} G_{tag} G_{reader} \tau \rho \eta \quad (3)$$

-continued
$$= \left(\frac{\lambda}{4\pi d}\right)^4 P_{rout} (G_{tag} G_{reader} \rho)^2 \eta(\tau)^2$$

By expressing the Friis formula (3) in decibel form, $P_{Loss}$ is defined as:

$$P_{Loss} = P_{rout} - P_{rin} \quad (4)$$

$$= -2(G_{tag} + G_{reader}) + 40\log_{10}\left(\frac{4\pi}{\lambda}\right) + 40\log_{10}(d)$$

$$-2\rho(\Theta) - \eta - 20\log_{10}(\tau)$$

$$= \underbrace{-2G_{reader} + 40\log_{10}\left(\frac{4\pi}{\lambda}\right) - \eta}_{\text{fixed part}} +$$

$$\underbrace{P_{rin}(d, \Theta)}_{\text{setup part}, 40\log_{10}(d) - 2\rho(\Theta)}$$

$$- \underbrace{2G_{tag} + P_{rin}(Z_A, Z_C)}_{\text{sensing part}, P_{rin}(Z_A, Z_C) = 20\log_{10}(\tau)}$$

In equation (4), $P_{Loss}$ is measurable, $P_{rout}$ is configurable by the user, and $P_{rin}$ is obtained from the RSSI of the backscattered signal from the RFID tag. Also, in equation (4), the $P_{Loss}$ can be divided into three parts (fixed part, setup part, and sensing part). The fixed part contains gain of read antenna and the tag backscatter efficiency. The setup part is related to tag-reader mutual distance and orientation. The sensing part is formed by the gain of the RFID tag antenna, the impedance of the RFID tag antenna and chip.

The phase of the backscattered signal from RFID tag could be logically divided into three parts, which are expression of antenna impedance and chip impedance, and of mutual orientation angle $\Theta$ and of distance between tag-reader d. Hence, the phase $\phi$ could also be divided into a setup part and a sensing part.

$$\phi = \arg\left(\frac{1}{Z_C + Z_A}\right) + \phi(\rho_p(\Theta)) - 2kgd \quad (5)$$

$$= \underbrace{\phi(d, \Theta)}_{\text{setup part}} + \underbrace{\phi(Z_A, Z_C)}_{\text{sensing part}}$$

Based on equations (4) and (5), both measurable parameters ($P_{Loss}$, $\phi$) are affected by the measurement setup (d, $\Theta$) and the impedances of the RFID tag antenna and chip ($Z_A$, $Z_C$).

Figure 3:
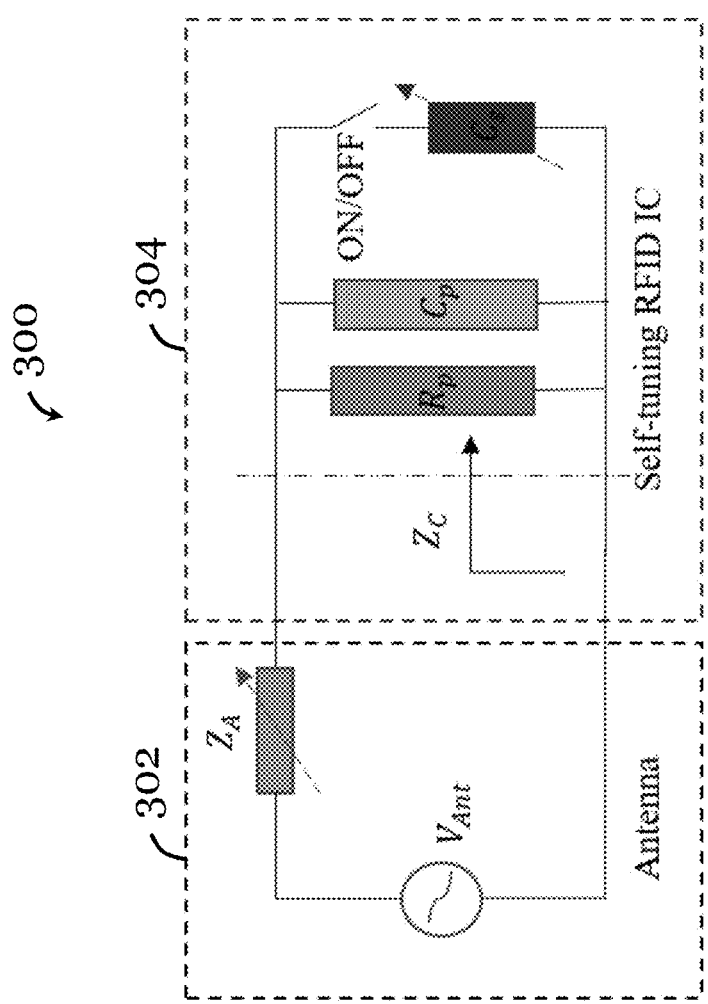
FIG. 3 is a circuit diagram illustrating a simplified model of an RFID tag in one embodiment of the invention.

In one example, the value of $Z_C$ is provided in the datasheet of the RFID tag/tag chip (integrated circuit of the RFID tag) with a simplified lumped element model. FIG. 3 shows a simplified model of an RFID tag sensor 200 in one embodiment of the invention. The RFID tag includes an antenna and an integrated circuit IC (chip) with self-tuning function. The self-tuning function may be provided by a tuning circuit, such as an impedance varying circuit, optionally as part of the IC. As shown in FIG. 3, the model 300 includes an antenna 302 modeled by a voltage source and a variable impedance $Z_A$, as well as a self-tuning integrated circuit 304 modeled by a resistor with resistance $R_p$ and a capacitor with capacitance $C_p$ arranged in parallel as well as a parallel variable capacitance/impedance $C_s$ provided by a tuning circuit.

In one application, the RFID tag may be attached to different objects, or may be arranged in different environments, which may change the antenna impedance. In this case, the chip impedance need to be adjusted. In particular, the self-tuning circuit adjusts the match network to locate the setting at which maximum power transfer (e.g., between the RFID reader and the RFID tag) is achieved. The optimized $C^*_s$ maximizes the $\tau(Z_A, Z_C)$ and can be obtained by equation (6):

$$C_s^+ = \arg\max_{C_s^{min} \leq C_s \leq C_s^{max}} \tau(Z_A, Z_C(C_s)) \qquad (6)$$

In an exemplary RFID tag with self-tuning capability, the $C^*_s$ is picked from a discrete capacitance list, and the value of $C^*_s$ is saved in chip memory with digital value V. As an example, the value of $R_p$, $C_p$, $C_s$ and V of the Monza® R6-P RAIN RFID tag chip manufactured by Impinj Inc. are shown in Table I.

TABLE I

SELF-TUNING PARAMETERS OF R6-P CHIP

| $R_p(\Omega)$ | $C_p(pF)$ | $C_s(fF)$ | V(Hex) |
|---|---|---|---|
| 1500 | 1.44 | −80 | 0000 |
|  |  | −40 | 0001 |
|  |  | 0 | 0002 |
|  |  | 60 | 0003 |
|  |  | 100 | 0004 |

With the self-tuning function, the RFID chip could function optimally with a wider antenna impedance area.

Figure 4:
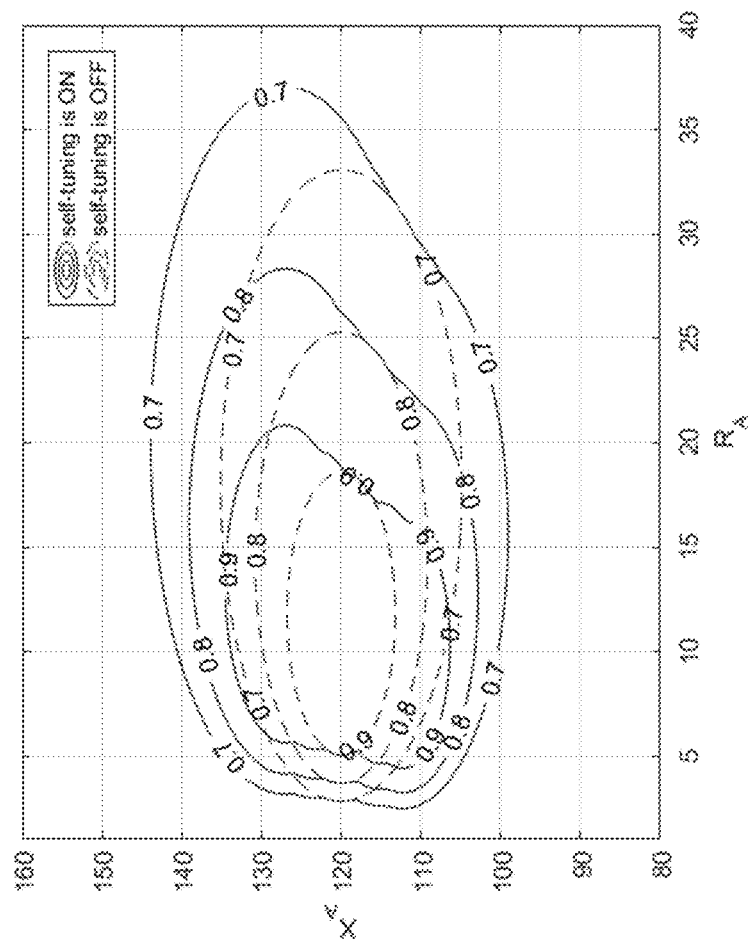
FIG. 4 is a contour plot of power transfer coefficients T when the self-tuning function of the RFID tag of FIG. 3 is enabled and disabled respectively.

FIG. 4 shows the power transfer coefficients $\tau$ when the self-tuning function of the RFID tag of FIG. 3 is enabled and disabled respectively. In FIG. 4, the solid lines show the contour plot of $\tau$ when the self-tuning is ON and the dash lines show the contour plot of $\tau$ when the self-tuning is OFF. It can be seen that the enabling self-tuning function enlarges the coverage of the same $\tau$. In one example, the self-tuning function of the RFID tag is controllable to be selectively ON and OFF with a Write command or a single word BlockWrite command from the RFID reader with which the RFID tag communicates. When the self-tuning is turned OFF, $C_s$ is disconnected. When the self-tuning is turned ON, $C_s$ is connected and the self-tuning circuit finds $C_s^*$ by equation (6) and stores the self-tuning value V in a memory of the integrated circuit of the RFID tag.

An embodiment of a RFID-based sensing system is now described in greater detail. In this embodiment, the RFID-based sensing system is a setup-independent UHF RFID sensing system. The system includes at least one RFID reader and at least one RFID tag (or RFID tag sensor) with self-tuning function as presented above. The RFID tag is a passive RFID tag, which includes a transducer-integrated antenna that is arranged to sense the environment $\Psi$ an integrated circuit coupled with the antenna, and a tuning circuit arranged to adjust or facilitate impedance matching between the antenna and the integrated circuit. In this example the tuning circuit is part of the integrated circuit. In one example, there may be k discrete environmental states ($\Psi_i$, i=1, 2, . . . k) arranged to be sensed. The parameters for sensing the status of the environment are collected by on/off differential (OOD) measurement, as explained in greater detail below. The RFID tag (e.g., the antenna) may be optimized such that the sensing indicator (e.g., OOD parameters) is unique for each respective Wi.

OOD measurement is first presented. In transducer-integrated RFID tag sensor, the impedance of antenna $Z_A(\Psi_i)$ changes with environmental state $\Psi_i$. Define $Z_C^{ON}(\Psi_i)$, $Z_C^{OFF}$ as the chip impedance when the self-tuning function of the RFID tag is in ON state and in OFF state respectively. In the OFF state, the RFID integrated circuit (chip) keeps its impedance without any change, where $Z_C^{OFF}=Z_C(C_s=0)$. In the ON state, the RFID integrated circuit (chip) adjusts its impedance where $Z_C^{ON}=Z_C(C_s=C^*_s)$. The value of phase and $P_{Loss}$ collected in the OFF state should be different with in the ON state when $C^*_s \neq 0$. In this example, the differences in phases and $P_{Loss}$ and $C^*_s$ are defined as OOD parameters.

From equation (4), the path loss $P_{Loss}$ in the ON and OFF states can be written as:

$$P_{Loss}^{ON}(\Psi) = -2G_{reader} + 40\log_{10}\left(\frac{4\pi}{\lambda}\right) - \eta + P_{rin}(d, \Theta) \qquad (7)$$
$$\quad -2G_{tag}(\Psi) - P_{rin}(Z_A(\Psi), Z_C^{ON}(\Psi))$$

$$P_{Loss}^{OFF}(\Psi) = -2G_{reader} + 40\log_{10}\left(\frac{4\pi}{\lambda}\right) - \eta + P_{rin}(d, \Theta)$$
$$\quad -2G_{tag}(\Psi) - P_{rin}(Z_A(\Psi), Z_C^{OFF})$$

Then, the difference of path loss $P_{Loss}^D(\Psi)$ is defined as:

$$P_{Loss}^D(\Psi) = P_{Loss}^{ON}(\Psi) - P_{Loss}^{OFF}(\Psi) \qquad (8)$$
$$= -P_{rin}(Z_A(\Psi), Z_C^{ON}(\Psi)) + P_{rin}(Z_A(\Psi), Z_C^{OFF})$$

With similar calculation, the difference of phase $\phi^D(\Psi)$ is:

$$\phi^D(\Psi) = \phi^{ON}(\Psi) - \phi^{OFF}(\Psi) \qquad (9)$$
$$\phi(Z_A(\Psi), Z_C^{ON}(\Psi)) - \phi(Z_A(\Psi), Z_C^{OFF})$$

The $C^*_s$ is collected with the readable self-tuning value V. The difference of V is defined as $V^D(\Psi)$:

$$V^D(\Psi) = V^{ON}(\Psi) - V^{OFF}(\Psi) \qquad (10)$$

From the above, it can be seen that $P_{Loss}^D(\Psi)$, $\phi^D(\Psi)$, $V^D(\Psi)$ rely only on relations of $Z_A(\Psi)$, $Z_C^{ON}(\Psi)$, $Z_C^{OFF}$ and are not affected by the RFID tag to RFID reader distance d and angle $\Theta$. The OOD($\Psi$) vector is a setup-independent indicator and can be constructed as:

$$OOD(\Psi) = [P_{Loss}^D(\Psi), \phi^D(\Psi), V^D(\Psi)] \qquad (11)$$

Figure 5:
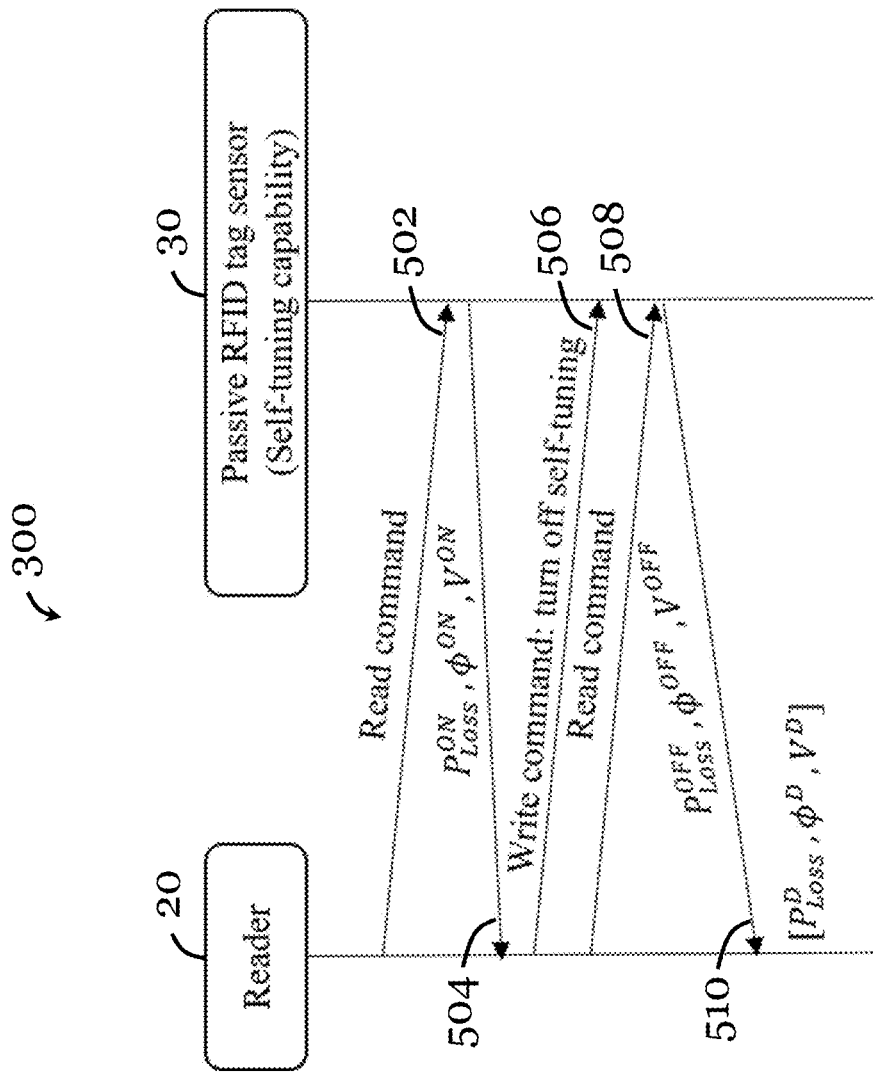
FIG. 5 is a flow chart illustrating a RFID-based sensing method in one embodiment of the invention.

FIG. 5 illustrates a RFID-based sensing method 500 in one embodiment of the invention. The method 500 begins in step 502, in which the RFID reader 20 transmits an RF signal (e.g., read command) to the passive RFID tag sensor 30. Then, in step 504, the RFID tag sensor 30, upon receiving the signal from the RFID reader 20, transmits a responsive RF signal to the RFID reader 20. The responsive RF signal includes useful information including: phase, power level (e.g., path loss, RSSI, etc.), and a tuning parameter associated with the tuning circuit the RFID tag sensor 30. The tuning circuit is enabled (e.g., turned on) when the RFID tag sensor 30 transmits the responsive signal in step 504. In step 506, the RFID reader 20 transmits another RF signal (e.g., write command) to the passive RFID tag sensor 30 to disable (e.g., turn off) the tuning circuit, and in step 508, another RF signal (e.g., read command) to the RFID tag sensor 30. In step 510, the RFID tag sensor 30, upon receiving the signal from the RFID reader 20, transmits a responsive RF signal to the RFID reader 20. The responsive RF signal includes useful information including phase, power level (e.g., path loss, RSSI, etc.), and a tuning parameter associated with the tuning circuit the RFID tag. The tuning circuit is disabled (e.g., turned off) when the RFID tag transmits the responsive signal in step 510. The RFID reader 20 subsequently determines a difference in phases, a difference in power levels, and a difference in tuning parameters between the two responsive RF signals, and used these differences as a basis for determining a status associated with an environment in which the RFID tag is arranged. Take the RFID tag with the R6-P chip as an example, the self-tuning function of the RFID tag is controlled by an AutoTune disable bit in the word 04h of RESERVED bank; the RFID reader 20 may acquires the AutoTune value by issuing a single READ command to word 0Eh of RESERVED bank.

It would be appreciated that modifications can be made to the method 500 in FIG. 5 to provide other embodiments of the invention. For example, one or more other properties of the responsive RF signals from the RFID tag sensor 30 can be used in the sensing function. Only one of the difference in phase and the difference in power level, along with the difference in tuning parameters, can be used in some implementations. The order of the steps can be varied as long as the skilled person appreciates that the modifications are logical and feasible. Some steps can be performed substantially simultaneously; some steps can be combined into one step; some steps can be further split into additional steps, as long as the skilled person appreciates that the modifications are logical and feasible.

A robust sensing is to build a unique mapping between $OOD(\Psi_i)$ with status of the environment $\Psi_i$. In some RFID chips, the small adjustable range of self-tuning function requests that antenna optimization be implemented so as to maximize the pairwise Euclidean distance (dist) of all OOD ($\Psi_i$). The tag sensor efficiency (TSE) is defined as minimal dist among all OOD pairs:

$$TSE = \min\{distOOD(\Psi_i), OOD(\Psi_j))\}, \forall\ i \neq j \quad (12)$$

Meanwhile, the minimal power transfer coefficient among all $\Psi_i$ should be maximized in order to guarantee the communication performance. Hence, the power transfer efficiency (PTE) is defined as $$PTE = \min(\tau^{ON}(\Psi_i)), \forall\ i \quad (13)$$

In one implementation the antenna layout x is designed so as the TSE and PTE are maximized simultaneously. The $x_{lower}$ and $x_{upper}$ is the lower and upper bounds of antenna layout, respectively.

$$\max(TSE + PTE) \quad (14)$$
$$\text{s.t. } x_{lower} \leq x \leq x_{upper}$$

Based on equations (8), (9), and (10), the range of each OOD parameters can be obtained as: $P_{Loss}^D \in [-3, 0]$, $\phi^D(\Psi) \in [-2\pi, 2\pi]$ and $V^D(\Psi) \in [-2,2]$. When optimizing equation (14), the TSE and PTE could be nominalized and be allocated different weight by system requirement. In this embodiment, the TSE and PTE are assigned same weight. However, in other embodiments, they may be assigned different weights.

Figure 6:
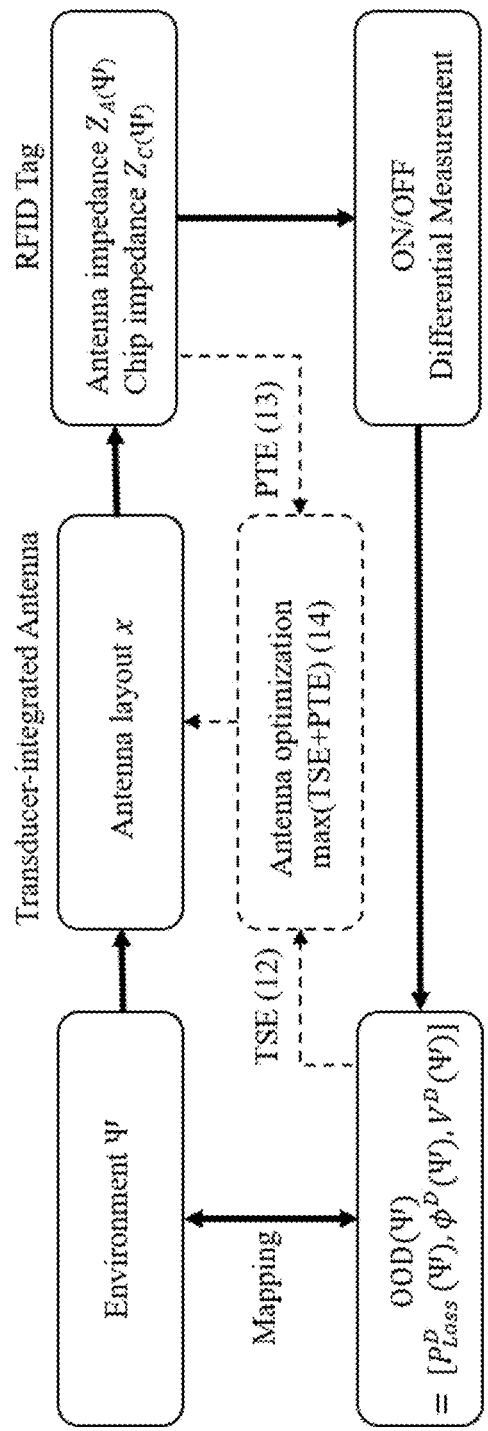
FIG. 6 is a flow chart illustrating a RFID-based sensing scheme in one embodiment of the invention.

FIG. 6 illustrates the above described RFID-based sensing scheme in one embodiment of the invention.

Figure 7B:
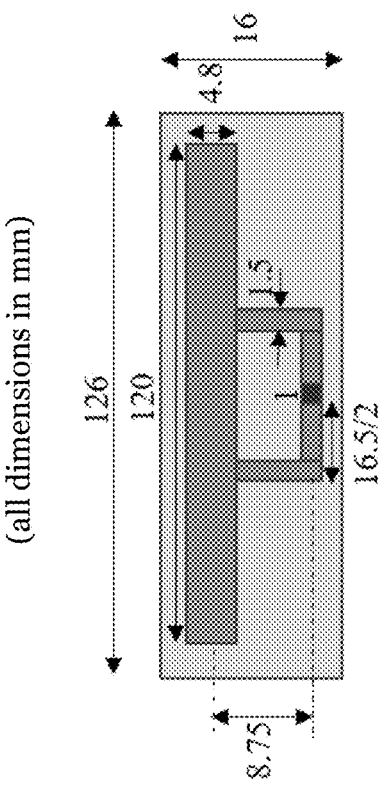
FIG. 7B is a plan view of a layout of the antenna of the RFID tag used in the water fill level sensor of FIG. 7A.
Figure 7A:
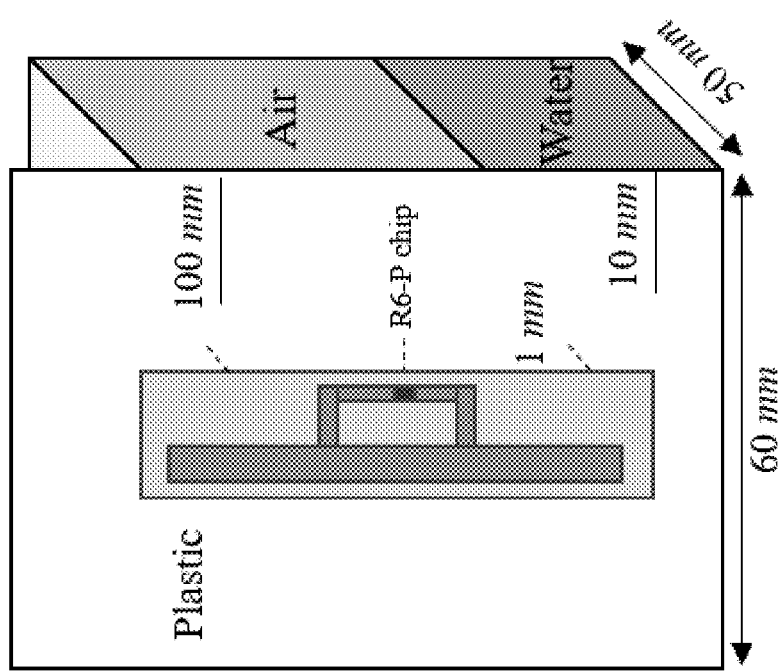
FIG. 7A is a schematic diagram of a simulation setup of a RFID tag based water fill level sensor in one embodiment of the invention.

To demonstrate the above embodiment, a RFID-based sensing system for determining water filling level is built. In this demonstration, the RFID tag includes the Monza® R6-P chip (self-tuning capability chip) and a T-match antenna. The T-match antenna is printed on FR-4 substrate (thickness: 1.55 mm, relative permittivity: $\varepsilon_r$=4.4). The RFID tag sensor is placed in front of a plastic container within which water is filled, and the distance between tag sensor and container is 1 mm. The water canister is modeled by a 0.5 mm thick plastic box with a relative permittivity of $\varepsilon_r$=2.25, the relative permittivity of water is fixed to $\varepsilon_r$=81. In this example, the states of water filling level $\Psi$ are defined ($\Psi \in [0,20,40,60,80,100,120]$ mm). The operational frequency is 915 MHz. The simulation setup is schematically shown in FIG. 7A.

With the chip parameters listed in Table I, the antenna layout is optimized by maximizing the objective given in equation (14). Here, ANSYS High-Frequency Structure Simulator (HFSS) is the simulation software and efficient global optimization (EGO) is used, and the optimized antenna dimensions in this example are shown in FIG. 7B.

Table II lists the OOD parameters at different water filling levels.

TABLE II

| OOD RESULT OF OPTIMIZED ANTENNA | | | | | | |
|---|---|---|---|---|---|---|
| i | $\Psi_i$ (mm) | $P_{Loss}^D$ (dBm) | $\phi^D$ (rad) | $V^D$ | Freq (MHz) | TSE | PTE |
| 1 | 0 | −1 | 0.26 | −2 | 915 | 1.37 | 0.48 |
| 2 | 20 | 0 | 0 | 0 | | | |
| 3 | 40 | −0.5 | −0.24 | 1 | | | |
| 4 | 60 | −0.05 | 0.10 | −1 | | | |
| 5 | 80 | −0.42 | 0.09 | −2 | | | |
| 6 | 100 | −0.35 | −0.12 | 2 | | | |
| 7 | 120 | −3 | −0.28 | 2 | | | |

Figure 8:
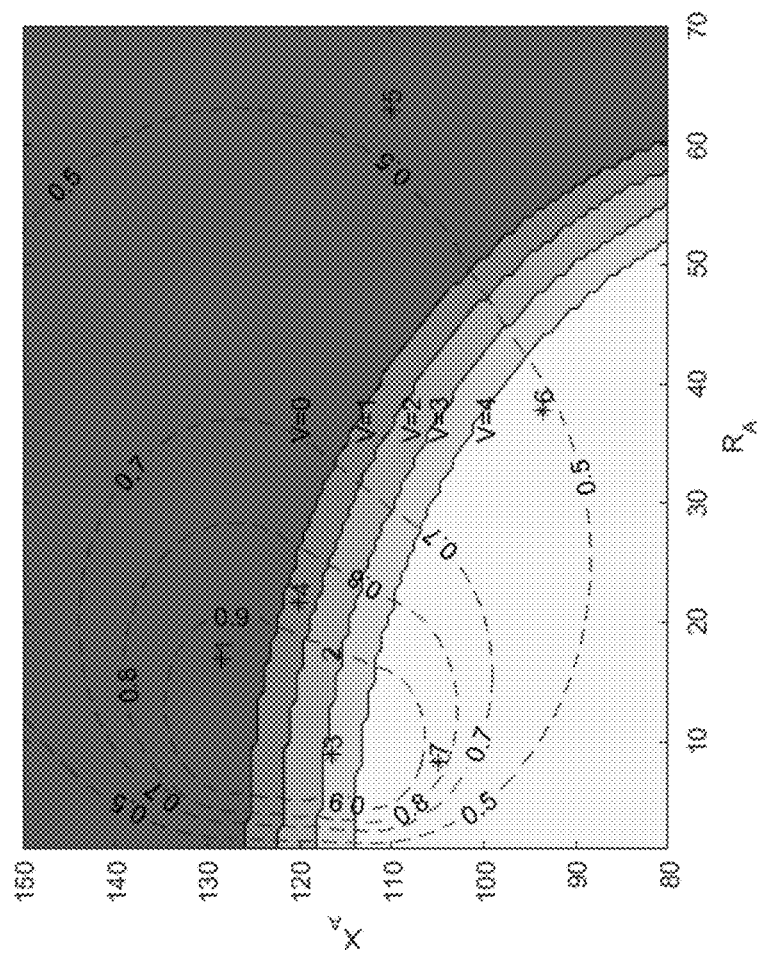
FIG. 8 is a plot showing the antenna impedance $Z_A(\Psi)$ with different self-tuning values V and a contour plot of power transfer coefficients $\tau$ when the self-tuning function of the RFID tag of FIG. 7A is enabled.

FIG. 8 is a plot of the antenna impedance $Z_A(\Psi)$, where the whole area is divided into five parts with different self-tuning values V. The partition is based on equation (6) and Table I. The star points with number from 1 to 7 indicate antenna impedances of the seven environmental states $\Psi$. The dash lines are contour plot of $\tau$ when self-tuning is ON.

The optimized T-match tag is fabricated and attached on a water bottle. The RFID reader used in this example is a ThingMagic™ M6e Micro-LTE module with a 2 dBi circularly polarized ceramic antenna (ThingMagic, Inc.)

Figure 9:
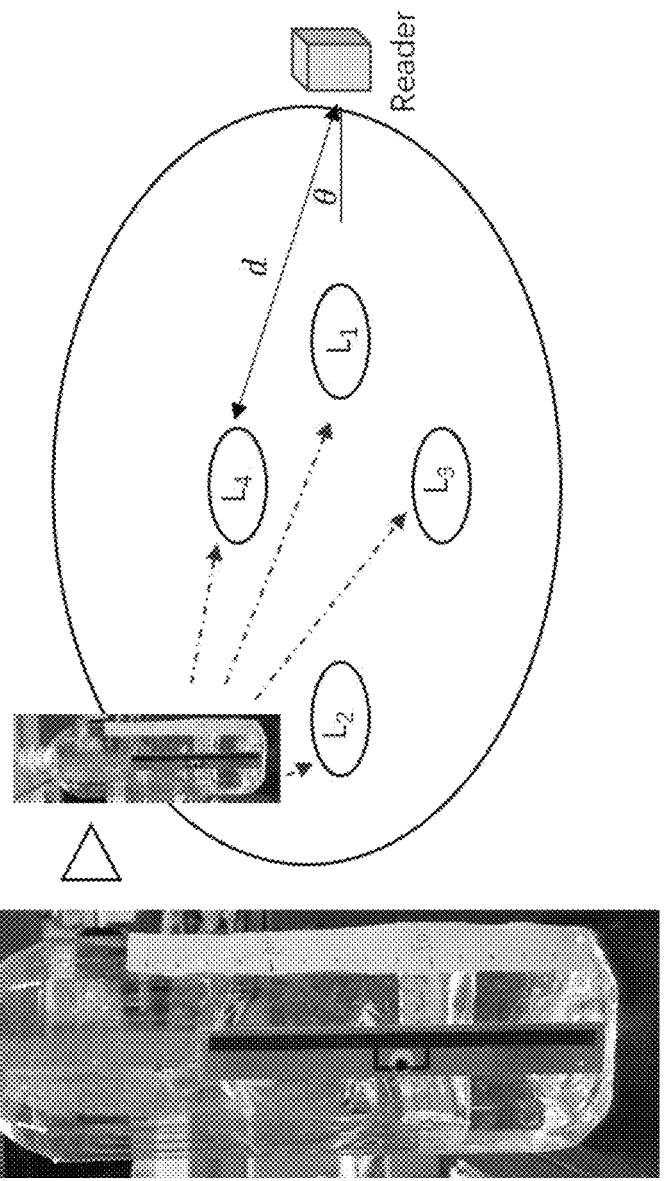
FIG. 9 is a schematic diagram of an experimental setup of a RFID-based sensing system including the water fill level sensor of FIG. 7A.

To validate the setup-independent performance, the RFID tag sensor attached water bottle is placed in different locations $L_1$ to $L_4$ as shown in FIG. 9. The distance and angle (d, $\Theta$) of $L_1$-$L_4$ are (10 cm, 0°), (30 cm, 0°), (15 cm, −20°) and (15 cm, 10°) respectively. For water filling level 80 mm, the antenna gain is small so the distance of $L_1$-$L_4$, $L_1^c$ is set as (5 cm, 15 cm, 10 cm, 10 cm), respectively. This change would not affect the results.

In the experiment, $L_1^c$ is defined, where a 2 mm cardboard is placed between the water bottle and reader antenna in $L_1$.

The operational frequency is 905 MHz, a 10 MHz difference with simulation. In the experiment, the frequency hop is disabled and the frequency is locked at 905 MHz.

Figure 10:
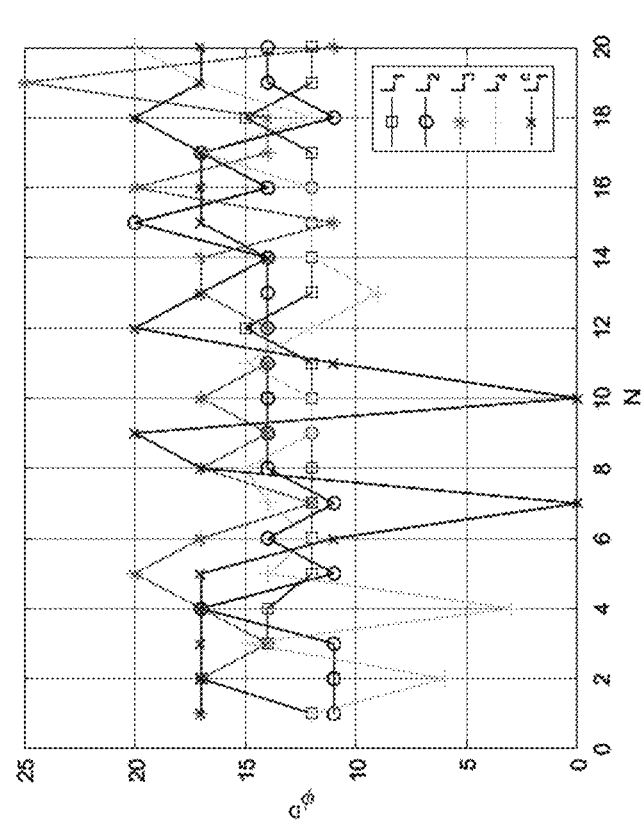
FIG. 10 is a graph showing raw phase differential measurement of 0 mm water filling level in different locations.

As the raw phase measurement shows little fluctuation after phase unwrapping, the OOD parameters are collected N times at each location. In FIG. 10, the raw phase differential measurement $\phi^D(\Psi_1=0\text{ mm})$ are shown. In order to reduce the unwrapping noise, the $\phi^D(\Psi)$ is processed with a lower pass filter having an N order low-pass finite impulse response (cut-off frequency is 0.05 Hz). A higher N value can increase the sensing accuracy as the low-pass filter can reduce the impacts of phase unwrapping.

In order to minimize the nonlinear effects of RFID tag chip, the output power of the RFID reader transmitter $P_{rout}$ is controlled so that the RFID chip operates at its sensitivity level. The read sensitivity of R6-P chip is −20 dBm, and the $P_{rout}$ is adjusted with equation (15) in the experiment. In equation (15), the $\Delta$(dBm) is random variable ranging from −0.5 dBm to 0.5 dBm, which helps to keep the impedance of tag chip in the stable region. $P_{Loss}^D(\Psi)$ is calculated by averaging N values.

$$P_{rout} = (-19 + \Delta)(\text{dBm}) + 0.5 * P_{Loss}(\text{dBm}) \quad (15)$$

In this demonstration, N=20. The filtered OOD parameters of the water filling level sensor are plotted in three-dimensional space, as shown in FIG. 11.

Figure 11:
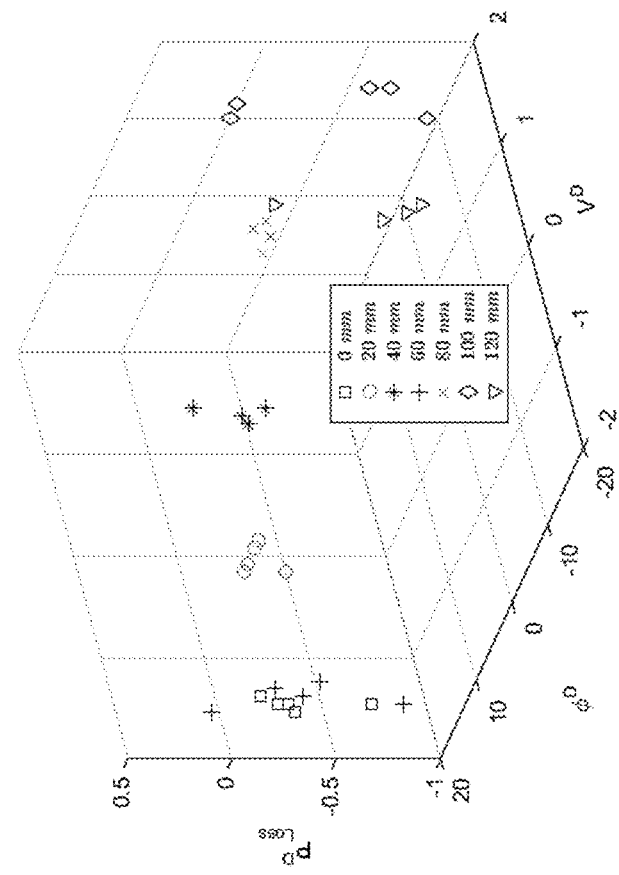
FIG. 11 is a 3D plot showing filtered parameters of differences in phases, power levels, and self-tuning parameters for different water filling levels in different locations L.
Figure 12:
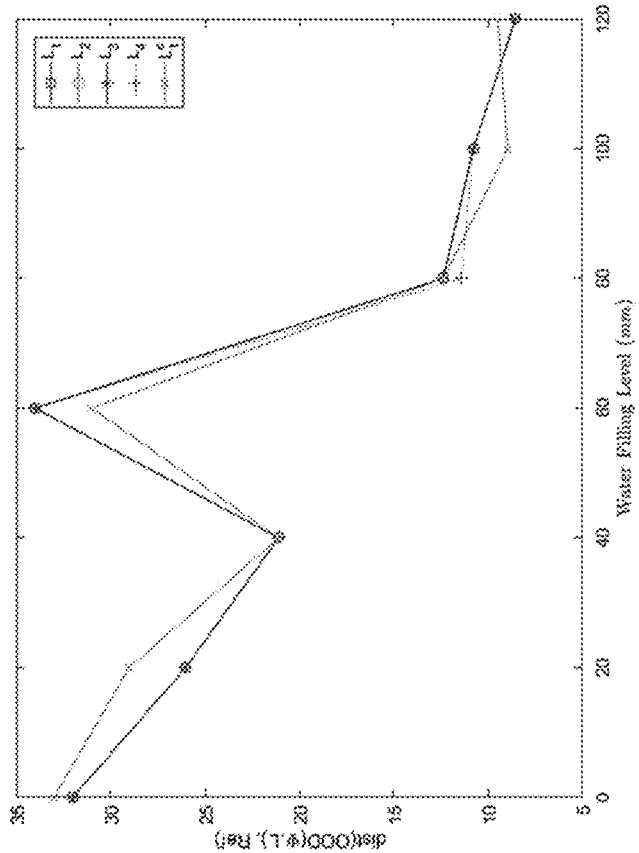
FIG. 12 is a graph showing Euclidean distances of the parameters of FIG. 12 from a reference point (Ref)

FIG. 11 clearly shows that the OOD parameters of same sensing state are clustered, while OOD parameters of different water filling levels are generally separated by noticeable distances. This illustrates that the OOD parameters work well as a setup-independent sensing indicator. In order to quantitatively show the effectiveness of OOD, a corner point [−2, −20, −0.5] of feasible area is chosen as the reference point (Ref). The Euclidean distance of ODD parameters and the reference point dist(OOD($\Psi$, L), Ref) is calculated and shown in FIG. 12.

The experimental results also show that multi- (three-) dimensional vector increases supported sensing states effectively. For water filling level 0 mm and 60 mm, the $V^D$ are the same. With the help of $P_{Loss}^D$ and $\Phi^D$, the related Euclidean distance is large enough to be distinguished from each other. The same situation happens between 100 mm and 120 mm.

The OOD parameters collected in $L_1^c$ (with a cardboard is placed between the reader and the tag) are shown in FIGS. 10 and 11. The results show that the OOD parameter is a setup-independent sensing indicator not only for a Line of Sight (LoS) case (i.e., no obstacle between reader and tag) but also for Non Line of Sight (NLoS) case (i.e., with obstacle(s) between reader and tag). Overall, the experimental results agree well with the simulation results.

Figure 13:
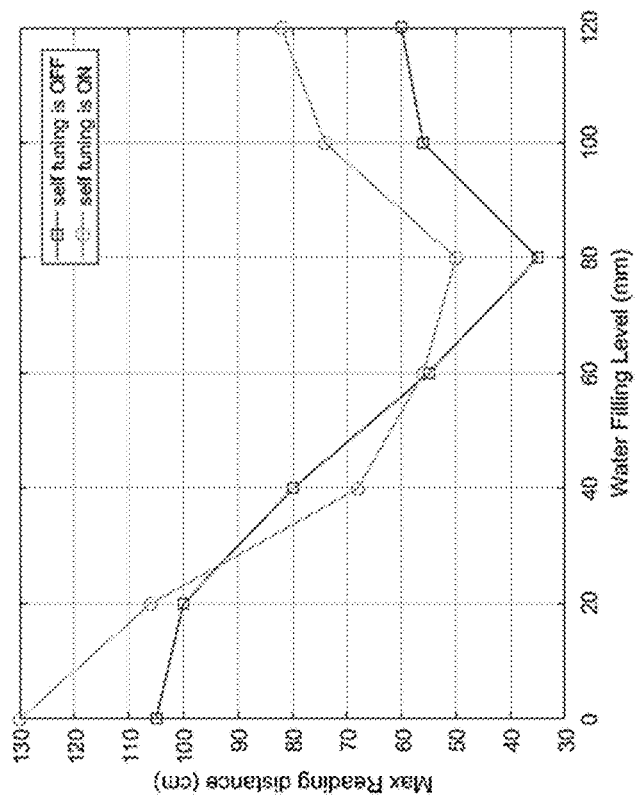
FIG. 13 is a graph showing maximum readable distances (cm) of the RFID tag from the RFID sensor when the self-tuning function of the RFID tag is enabled and disabled respectively.

FIG. 13 shows the maximum reading (readable) distances of self-tuning in ON state and OFF state where $P_{rout}$=30 dBm. In most of the water filling levels, the maximum reading distance of the self-tuning in ON state is bigger than that of the self-tuning in OFF state. For water filling level 40 mm, the $V^D$ equals to 0, which means that the self-tuning consumes power to find $C^*_s$, but $C^*_s=0$. That is the reason why $P_{Loss}^D(\Psi(40\text{ mm}))<0$. As a WRITE command is needed to switch the state of self-tuning capability, the actual working distance of OOD parameters is shorter than the maximum reading distances.

In the above water filling level example, the OOD parameters are validated as a setup-independent sensing indicator.

Comparing with some existing self-tuning-chip-based methods, the OOD parameters increase the supported sensing states.

Figure 14:
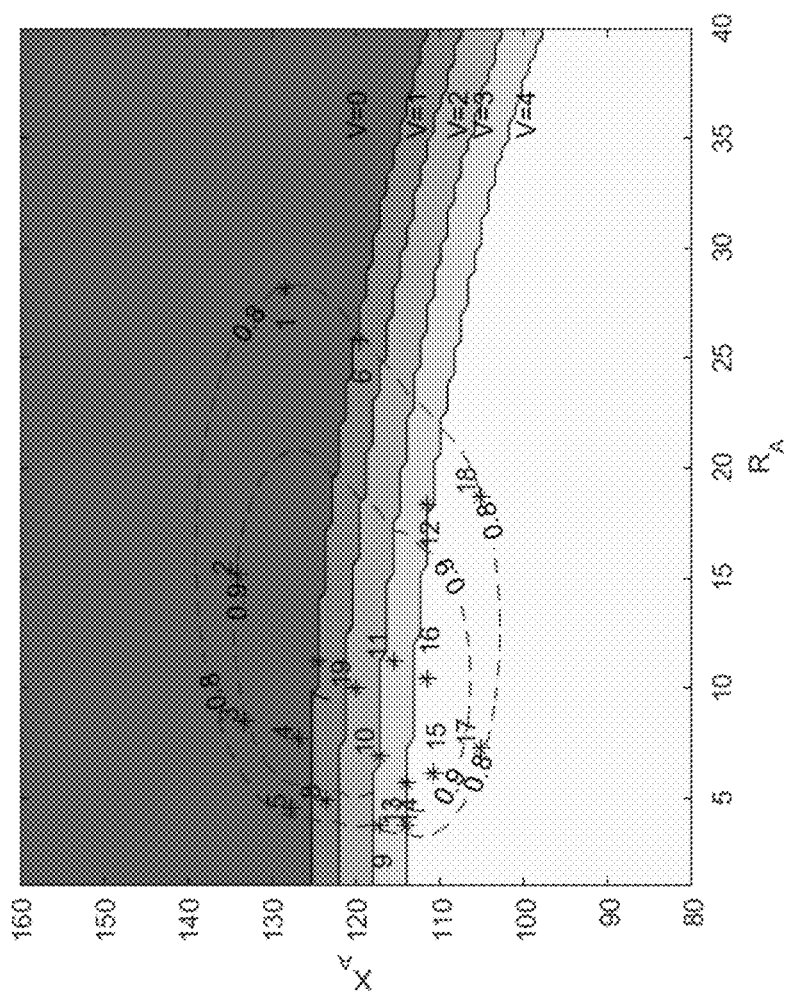
FIG. 14 is plot showing antenna impedance distribution and corresponding OOD parameters of 19 sensing states in one embodiment of the invention.

In this implementation, in order to ensure the power transfer efficiency in all sensing states, the feasible antenna impedance area is limited to $\tau^{ON} \geq 0.8$. Meantime, the phase unwrapping may introduce a ±3°, hence the minimal $\phi^D(\Psi)$ should be 6°. With suitable design, the supported sensing states could be enlarged into at least 19 states, where the pair-wise Euler distance is large enough to distinguish these different states by considering the phase unwrapping. The antenna impedance distribution and corresponding OOD parameters of 19 sensing states are shown in FIG. 14 and Table III, respectively. In this case, the tag sensor with multiple sensing capabilities can be provided with very low cost.

It should be noted that the OOD parameters are differential parameters, and the OOD parameters would be zeros if $Z_C$ is kept constant during ON and OFF switching of the self-tuning function or circuit. In FIG. 14, there should be only one sensing state (point 19) located in (V=2) zone, as the OOD parameters of all antenna impedance located in (V=2) is zeros.

TABLE III

| | OOD RESULT OF OPTIMIZED ANTENNA | | | |
|---|---|---|---|---|
| Freq (MHz) | $\Psi_i$ | $P_{Loss}^D$ (dBm) | $\phi^D$ (°) | $V^D$ |
| 915 | 1 | −1 | 33 | −2 |
| | 2 | −2 | 47 | −2 |
| | 3 | −2 | 57 | −2 |
| | 4 | −1 | 69 | −2 |
| | 5 | −2 | 81 | −2 |
| | 6 | 0 | 17 | −1 |
| | 7 | 0 | 29 | −1 |
| | 8 | 0 | 41 | −1 |
| | 9 | 0 | −64 | 1 |
| | 10 | 0 | −52 | 1 |
| | 11 | 0 | −40 | 1 |
| | 12 | 0 | −28 | 1 |
| | 13 | −2 | −100 | 2 |
| | 14 | −1 | −88 | 2 |
| | 15 | −3 | −76 | 2 |
| | 16 | −1 | −64 | 2 |
| | 17 | −3 | −52 | 2 |
| | 18 | −1 | −40 | 2 |
| | 19 | 0 | 0 | 0 |

The above disclosure has provided some embodiments of RFID-based sensing system and method of the invention. In one embodiment, the RFID reader is arranged to turn ON and OFF (or OFF and ON) the self-tuning function of the RFID tag sequentially and collects dynamics of phase, power amplitude and self-tuning value to build a multi-dimensional ON-OFF Differential (OOD) vector. As the measurement setup keeps constant during the ON and OFF switching, the OOD is a vector only related with RFID antenna impedance and RFID chip impedance. Then the reader extracts sensing information based on predetermined mapping relationship between the OOD parameters and the environmental states. In some embodiments, with additional impedance state(s), the OOD parameter is implemented by ON/OFF differential measurement. The OOD parameters remove the influences of measurement setup such as distance, scattering, orientation, etc. They form setup-independent sensing indicator under both LOS and NLOS conditions. To provide robust sensing with the OOD parameters, tag sensor efficiency (TSE) and power transfer efficiency (PTE) are used to optimize the layout of the antenna. The embodiments of the RFID-based sensing system and method may include one or more of these exemplary advantages:

- The OOD parameters provide a setup-independent sensing indicator. Unlike the extra hardware cost introduced by DPD, the OOD is obtained by sequential commands from RFID reader.
- The OOD parameters form a multi- (e.g., three-) dimensional vector, which combines dynamics of phase and/or power amplitude, and self-tuning value. Comparing with a single-dimension indicator, the OOD is more robust because of the increased pair-wise Euclidean distance of sensing states and the increased available sensing states.
- The minimal pair-wise Euclidean distance of OOD parameters is defined as the Tag Sensor Efficiency (TSE). The minimal power transfer coefficient among all sensing states is defined as Power Transfer Efficiency (PTE). The TSE and PTE can be maximized by optimizing the antenna design. The sensing robustness can be provided without substantially sacrificing communication performance.

Figure 15:
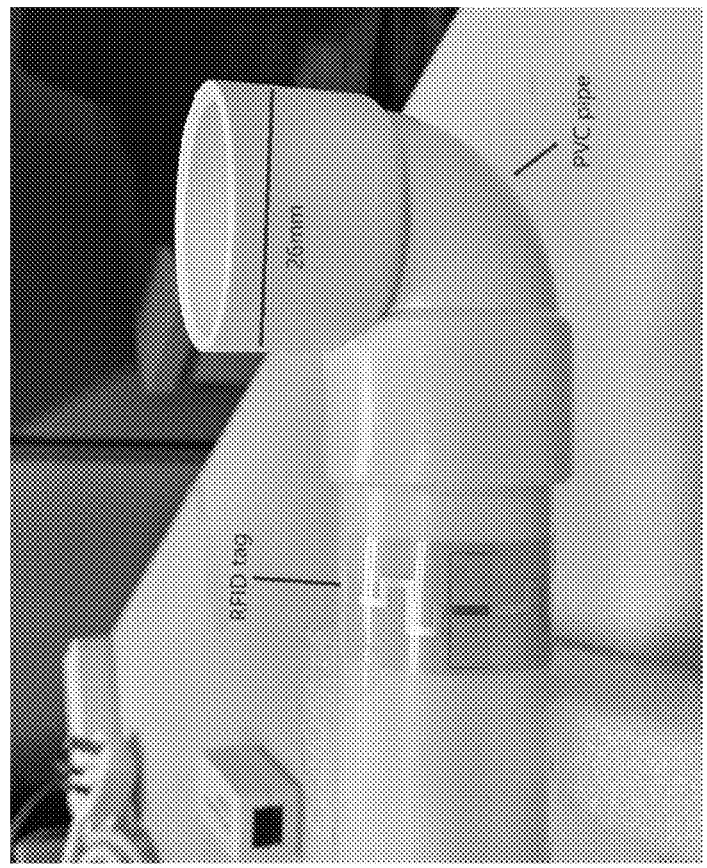
FIG. 15 is a picture showing an RFID tag sensor attached to a pipe in one embodiment of the invention.

FIG. 15 shows an implementation of an RFID-based sensing system 1500 in one embodiment. The system includes a flexible RFID tag sensor (with self-tuning function) attached around an outer surface of a PVC pipe, for detecting the fill level or blockage condition of the pipe. The tag sensor may be designed or deployed as discussed above.

Figure 16:
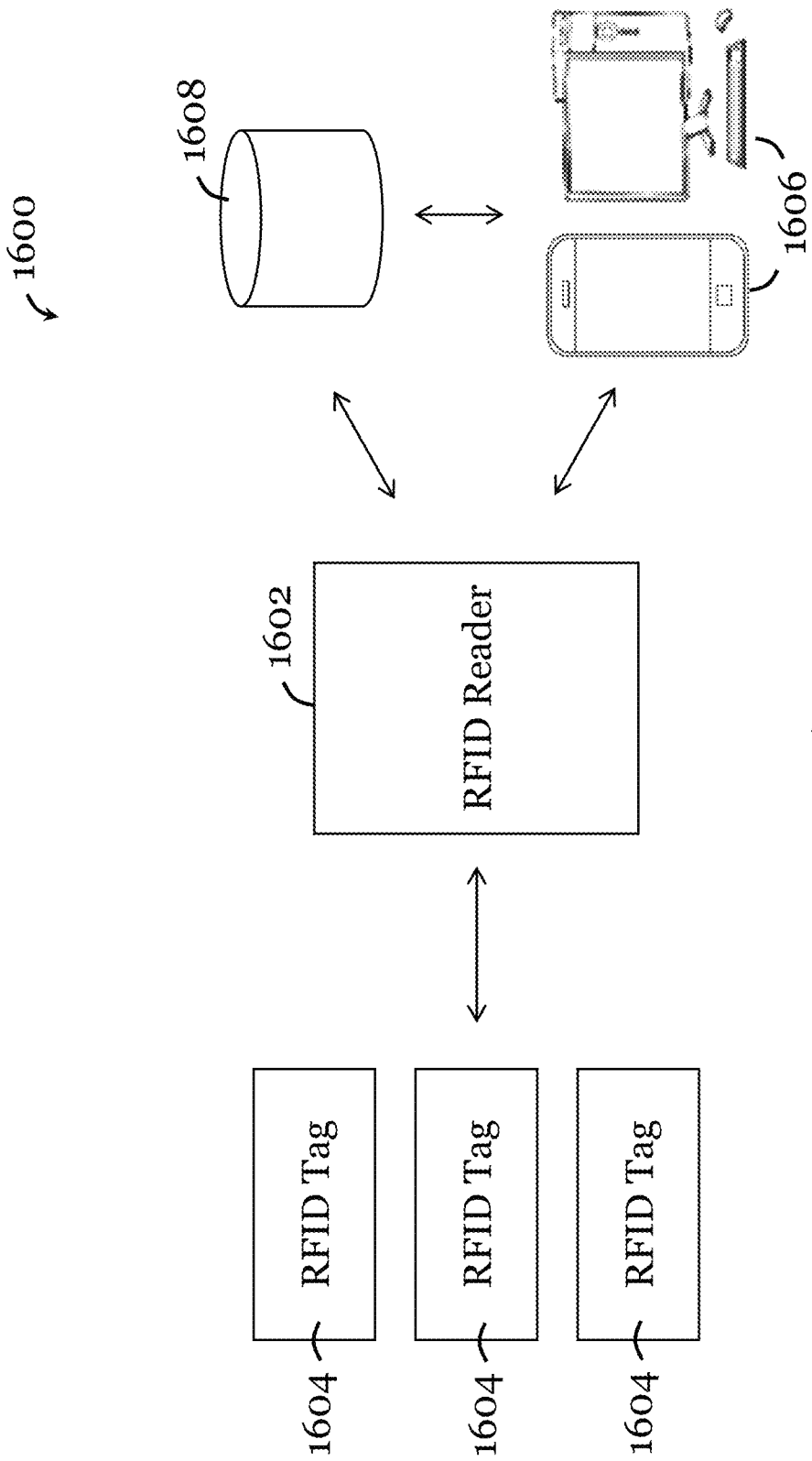
FIG. 16 is a block diagram illustrating an RFID-based sensing system in one embodiment of the invention.

FIG. 16 is a block diagram illustrating an RFID-based sensing system 1600 in one embodiment of the invention. The system 1600 includes a RFID reader 1602 and multiple passive UHF RFID tags 1064 (RFID tag sensors, with self-tuning function) arranged to communicate with the RFID reader 1602 via the RF communication link(s). The interaction between the RFID reader 1602 and the RFID tags 1604 may be such as that described above. The RFID reader 1602 may communicate with two or more of the RFID tags 1604 substantially simultaneously, or it may communicate with one RFID tag 1604 at a time. The RFID reader 1602 is arranged to communicate with an external or remote server 1608 as well as with external electronic devices 1606 (such as smart phone, tablet, desktop computer, notebook computer, PDA, or other information/data handling system), e.g., via wired or wireless communication link. The external electronic devices 1606 may communicate with the server 1608 directly via a wired or wireless communication link. The external electronic devices 1606 and/or server 1608 may be installed with software applications arranged to process, analyze, view, store, etc., information and/or data received from the RFID reader 1602. In one example the external electronic devices 1606 may receive information or data from the RFID reader 102 in real time. In one example the RFID reader 1602 is integrated into an external electronic device 1606.

Figure 17:
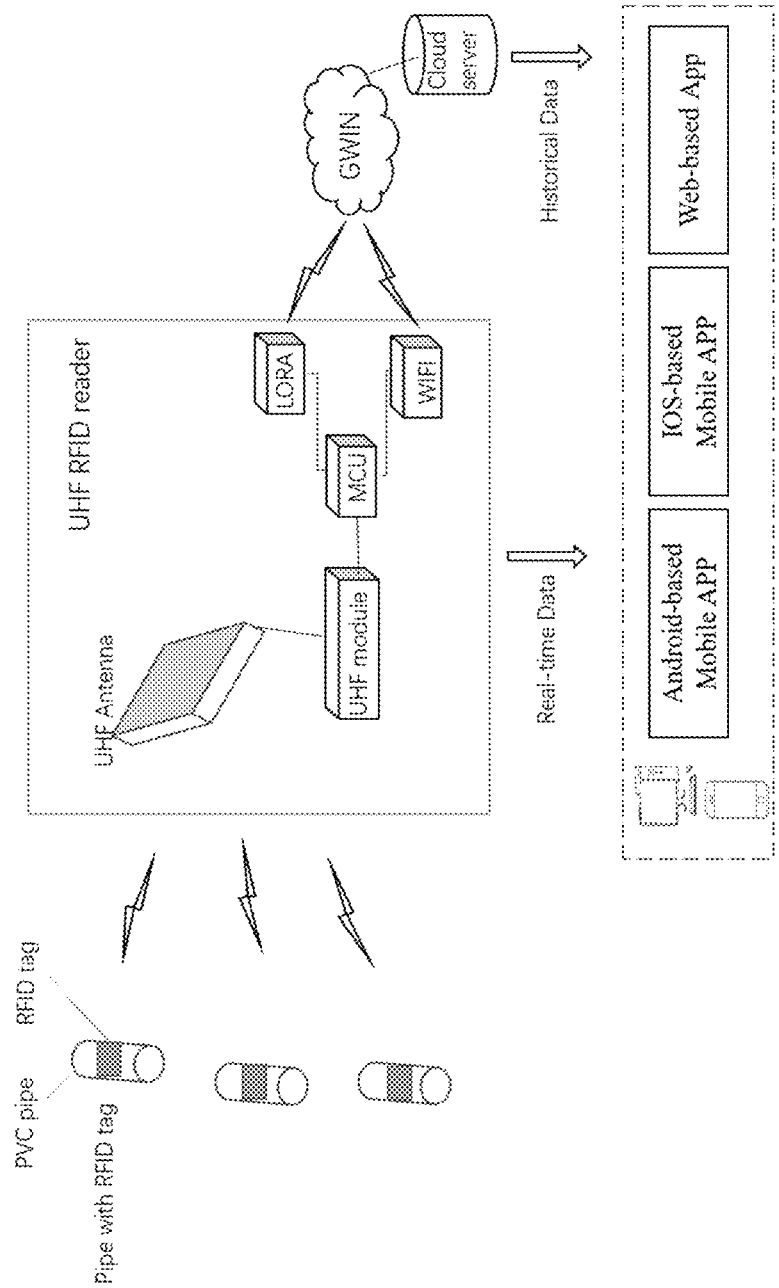
FIG. 17 is a schematic diagram showing an RFID-based sensing system in one embodiment of the invention.

FIG. 17 is a specific implementation of the systems 1500 and 1600 of FIGS. 15 and 16. In FIG. 17, the UHF RFID tags are attached to PVC pipes (different pipes or different sections of the same pipe) for sensing a fill level or a blockage state of the PVC pipe. The UHF RFID reader includes an UHF antenna arranged to communicate with the UHF RFID tags, a UHF module arranged to control operation (e.g., transmission and/or receiving) of the antenna, a controller (e.g., MCU) arranged to control operation of the reader, and a wireless communication module with a Long Range (LoRa) communication module and a Wi-Fi communication module. The wireless communication module enables real time communication of data and/or information to the external electronic device and/or the server. Through the system the PVC pipe or more generally the piping system can be monitored, e.g., in real time.

Figure 18:
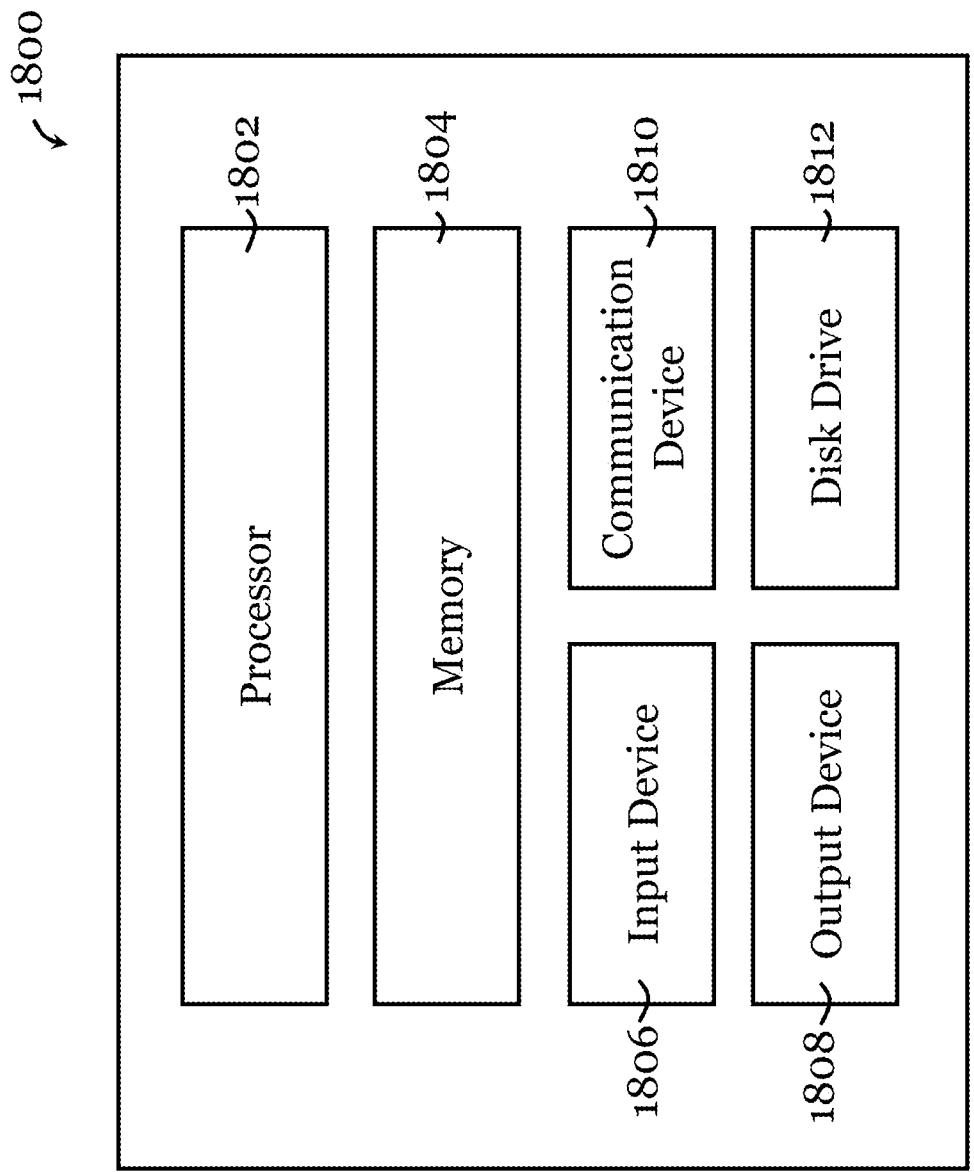
FIG. 18 is a functional block diagram of an information or data handling system in one embodiment of the invention.

FIG. 18 shows an exemplary information handling system 1800 that can be used as an information/data handling system in one embodiment of the invention. The information handling system 1800 generally comprises suitable components necessary to receive, store, and execute appropriate computer instructions, commands, or codes. The main components of the information handling system 1800 are a processor 1802 and a memory (storage) 1804. The processor 1802 may be formed by one or more of: CPU, MCU, controllers, logic circuits, Raspberry Pi chip, digital signal processor (DSP), application-specific integrated circuit (ASIC), Field-Programmable Gate Array (FPGA), or any other digital or analog circuitry configured to interpret and/or to execute program instructions and/or to process signals and/or information and/or data. The memory 1804 may include one or more volatile memory (such as RAM, DRAM, SRAM), one or more non-volatile memory (such as ROM, PROM, EPROM, EEPROM, FRAM, MRAM, FLASH, SSD, NAND, and NVDIMM), or any of their combinations. Appropriate computer instructions, commands, codes, information and/or data may be stored in the memory 1804. Optionally, the information handling system 1800 further includes one or more input devices 1806. Examples of such input device 1806 include one or more of: keyboard, mouse, stylus, image scanner (e.g., identifier (barcode, QR code, etc.) scanner), microphone, tactile/touch input device (e.g., touch sensitive screen), image/video input device (e.g., camera), biometric data input device (e.g., fingerprint detector, facial detector, etc.), etc. Optionally, the information handling system 1800 further includes one or more output devices 1808. Examples of such output device 1808 include one or more of: display (e.g., monitor, screen, projector, etc.), speaker, disk drive, headphone, earphone, printer, additive manufacturing machine (e.g., 3D printer), etc. The display may include a LCD display, a LED/OLED display, or any other suitable display that may or may not be touch sensitive. The information handling system 1800 may further include one or more disk drives 1812 which may encompass one or more of: solid state drive, hard disk drive, optical drive, flash drive, magnetic tape drive, etc. A suitable operating system may be installed in the information handling system 1800, e.g., on the disk drive 1812 or in the memory 1804. The memory 1804 and the disk drive 1812 may be operated by the processor 1802. The information handling system 1800 includes a communication device 1810 for establishing one or more communication links (not shown) with one or more other computing devices such as servers, personal computers, terminals, tablets, phones, watches, IoT devices, or other wireless or handheld computing devices. The communication device 1810 may include one or more of: an antenna (e.g., RFID transmitter/receiver/transceiver), a modem, a Network Interface Card (NIC), an integrated network interface, a NFC transceiver, a ZigBee transceiver, a Wi-Fi transceiver, a Bluetooth® transceiver, a radio frequency transceiver, an optical port, an infrared port, a USB connection, or other wired or wireless communication interfaces. Transceiver may be implemented by one or more devices (integrated transmitter(s) and receiver(s), separate transmitter(s) and receiver(s), etc.). The communication link(s) may be wired or wireless for communicating commands, instructions, information and/or data. In one example, the processor 1802, the memory 1804, and optionally the input device(s) 1806, the output device(s) 1808, the communication device 1810 and the disk drives 1812 are connected with each other through a bus, a Peripheral Component Interconnect (PCI) such as PCI Express, a Universal Serial Bus (USB), an optical bus, or other like bus structure. In one embodiment, some of these components may be connected through a network such as the Internet or a cloud computing network. A person skilled in the art would appreciate that the information handling system 1800 shown in FIG. 18 is merely exemplary and that the information handling system 1800 can in other embodiments have different configurations (e.g., additional components, fewer components, etc.). The information handling system 1800 may be used as a server, an external electrical device, an RFID reader, etc.

Although not required, the embodiments described with reference to the Figures can be implemented as an application programming interface (API) or as a series of libraries for use by a developer or can be included within another software application, such as a terminal or computer operating system or a portable computing device operating system. Generally, as program modules include routines, programs, objects, components and data files assisting in the performance of particular functions, the skilled person will understand that the functionality of the software application may be distributed across a number of routines, objects and/or components to achieve the same functionality desired herein.

It will also be appreciated that where the methods and systems of the invention are either wholly implemented by computing system or partly implemented by computing systems then any appropriate computing system architecture may be utilized. This will include stand-alone computers, network computers, dedicated or non-dedicated hardware devices. Where the terms "computing system" and "computing device" are used, these terms are intended to include (but not limited to) any appropriate arrangement of computer or information processing hardware capable of implementing the function described.

It will be appreciated by persons skilled in the art that numerous variations and/or modifications may be made to the invention as shown in the specific embodiments to provide other embodiments of the invention. The described embodiments of the invention should therefore be considered in all respects as illustrative, not restrictive.

The RFID-based sensing system and method of the invention may be used with different RFID tags and readers. The RFID tags can be semi-active (with power source) or passive (without power source). The RFID tag can be UHF RFID tags, or can be arranged to operate at different frequencies or frequency ranges. The reader can be arranged to communicate with one or more RFID tags, sequentially or simultaneously. The RFID tag can include one or more antennas, one or more integrated circuit coupled with the one or more antenna, and a tuning circuit arranged to adjust impedance matching of the one or more antenna and the one or more integrated circuit. The tuning circuit may be part of the integrated circuit or may be another part coupled with the integrated circuit and the antenna. The RFID reader may utilize two or more responsive RF signals from the RFID tag (each RF signal correspond to the tuning circuit at a respective state). In one example, the different states include the tuning circuit disabled and the tuning circuit enabled; in another example, the different states include the tuning circuit enabled at a first state and the tuning circuit enabled at a second state different from the first. The RFID tag used may be specifically designed for use in the FID based sensing system and method.

The RFID-based sensing system and method is not limited to the application of liquid fill level sensing, but can be used in different sensing applications to sense a status associated with an environment in which the RFID tag is arranged. The values of parameters associated with the RFID-based sensing system and method disclosed above are merely exemplary. These values can be modified or further optimized, depending on the specific applications of the RFID-based sensing system and method.

The invention claimed is:

1. A RFID-based sensing method, comprising:
receiving, from an RFID tag with a tuning circuit arranged to affect impedance matching of an antenna and an integrated circuit of the RFID tag and when the tuning circuit is arranged in a first state, a first RF signal;
receiving, from the RFID tag when the tuning circuit is arranged in a second state, a second RF signal;
processing the first and second RF signals received to determine respective differences in two or more properties of the first and second RF signals received; and
determining, based on the processing, a status associated with an environment in which the RFID tag is arranged.

2. The RFID-based sensing method of claim 1,
wherein the properties of the first RF signal comprises: phase of the first RF signal, power level of the first RF signal, and a first tuning parameter associated with the tuning circuit in the first state; and
wherein the properties of the second RF signal comprises: phase of the second RF signal, power level of the second RF signal, and a second tuning parameter associated with the tuning circuit in the second state.

3. The RFID-based sensing method of claim 2, wherein the processing comprises:
determining a difference between the first and second tuning parameters; and
determining one or both of: a difference between the power level of the first RF signal and the power level of the second RF signal, and a difference between the phase of the first RF signal and the phase of the second RF signal.

4. The RFID-based sensing method of claim 3, wherein the processing comprises:
filtering, using a low-pass filter, a difference the phase of the first RF signal and the phase of the second RF signal.

5. The RFID-based sensing method of claim 1, wherein the determining comprises:
determining, based on predetermined mapping between differences in properties of the first and second RF signals received and statuses associated with the environment, the status associated with the environment in which the RFID tag is arranged.

6. The RFID-based sensing method of claim 1,
wherein the tuning circuit is enabled in one of the first state and the second state; and
wherein the tuning circuit is disabled in another one of the first state and the second state.

7. The RFID-based sensing method of claim 1,
wherein the tuning circuit is arranged to provide a first impedance matching between the antenna and the integrated circuit in the first state; and
wherein the tuning circuit is arranged to provide a second impedance matching between the antenna and the integrated circuit in the second state.

8. The RFID-based sensing method of claim 1, further comprising transmitting a signal to the RFID tag to cause the tuning circuit to change from the first state to the second state.

9. The RFID-based sensing method of claim 1, further comprising transmitting one or more signals to the RFID tag to trigger transmission of the first and second RF signals from the RFID tag.

10. The RFID-based sensing method of claim 1, wherein the tuning circuit is a self-tuning circuit arranged to facilitate impedance matching of the antenna and the integrated circuit.

11. The RFID-based sensing method of claim 1,
wherein the RFID tag is arranged to be attached to a liquid container or pipe, and
wherein the status associated with the environment in which the RFID tag is arranged includes a fill level of the liquid container or pipe to which the RFID tag is attached.

12. A RFID-based sensing method, comprising:
transmitting, from an RFID tag with a tuning circuit arranged to affect impedance matching of an antenna and an integrated circuit of the RFID tag to an RFID reader, a first RF signal when the tuning circuit is arranged in a first state; and
transmitting, from the RFID tag to the RFID reader, a second RF signal when the tuning circuit is arranged in a second state;
wherein the first and second RF signals are arranged to be processed at the RFID reader to determine respective differences in two or more properties of the first and second RF signals and to determining a status associated with an environment in which the RFID tag is arranged.

13. The RFID-based sensing method of claim 12,
wherein the properties of the first RF signal comprises: phase of the first RF signal, power level of the first RF signal, and a first tuning parameter associated with the tuning circuit in the first state; and
wherein the properties of the second RF signal comprises: phase of the second RF signal, power level of the second RF signal, and a second tuning parameter associated with the tuning circuit in the second state.

14. The RFID-based sensing method of claim 12,
wherein the tuning circuit is enabled in one of the first state and the second state; and
wherein the tuning circuit is disabled in another one of the first state and the second state.

15. The RFID-based sensing method of claim 12,
wherein the tuning circuit is arranged to provide a first impedance matching between the antenna and the integrated circuit in the first state; and
wherein the tuning circuit is arranged to provide a second impedance matching between the antenna and the integrated circuit in the second state.

16. The RFID-based sensing method of claim 12, further comprising:
receiving, from the RFID reader, a signal to cause the tuning circuit to change from the first state to the second state.

17. The RFID-based sensing method of claim 12, further comprising:
receiving, from the RFID reader, one or more signals to trigger transmission of the first and second RF signals.

18. The RFID-based sensing method of claim 12, wherein the tuning circuit is arranged to adjust an impedance of the integrated circuit to affect impedance matching of the antenna and the integrated circuit.

19. The RFID-based sensing method of claim 12, wherein the tuning circuit is a self-tuning circuit arranged to facilitate impedance matching of the antenna and the integrated circuit.

20. The RFID-based sensing method of claim 12, wherein the RFID tag is attached to a liquid container or pipe, and the status associated with the environment in which the RFID tag is arranged includes a fill level of the liquid container or pipe to which the RFID tag is attached.

21. A RFID reader comprising:
an antenna arranged to
receive, from an RFID tag with a tuning circuit arranged to affect impedance matching of an antenna and an integrated circuit of the RFID tag and with the tuning circuit arranged in a first state, a first RF signal; and
receive, from the RFID tag with the tuning circuit arranged in a second state, a second RF signal; and
a controller arranged to
process the first and second RF signals received to determine respective differences in two or more properties of the first and second RF signals received; and
determine, based on the processing, a status associated with an environment in which the RFID tag is arranged.

22. The RFID reader of claim 21,
wherein the properties of the first RF signal comprises: phase of the first RF signal, power level of the first RF signal, and a first tuning parameter associated with the tuning circuit in the first state; and
wherein the properties of the second RF signal comprises: phase of the second RF signal, power level of the second RF signal, and a second tuning parameter associated with the tuning circuit in the second state.

23. The RFID reader of claim 22, wherein the controller is arranged to process the first and second RF signals to:
determine a difference between the first and second tuning parameters; and
determine one or both of: a difference between the power level of the first RF signal and the power level of the second RF signal, and a difference between the phase of the first RF signal and the phase of the second RF signal.

24. The RFID reader of claim 23, wherein the controller is arranged to filter, using a low-pass filter, a difference the phase of the first RF signal and the phase of the second RF signal.

25. The RFID reader of claim 21, wherein the controller is arranged to determine, based on predetermined mapping between differences in properties of the first and second RF signals received and statuses associated with the environment, the status associated with the environment in which the RFID tag is arranged.

26. The RFID reader of claim 21,
wherein the tuning circuit is enabled in one of the first state and the second state; and
wherein the tuning circuit is disabled in another one of the first state and the second state.

27. The RFID reader of claim 21,
wherein the tuning circuit is arranged to provide a first impedance matching between the antenna and the integrated circuit in the first state; and wherein the tuning circuit is arranged to provide a second impedance matching between the antenna and the integrated circuit in the second state.

28. The RFID reader of claim 21, wherein the antenna is arranged to:
   transmit a signal to the RFID tag to cause the tuning circuit to change from the first state to the second state; and
   transmit one or more signals to the RFID tag to trigger transmission of the first and second RF signals from the RFID tag.

29. A RFID-based sensing system comprising:
   a RFID reader of claim 21; and
   one or more RFID tags each arranged to communicate with the RFID reader, each of the RFID tags including, respectively, an antenna, an integrated circuit coupled to the antenna, and a tuning circuit arranged to affect impedance matching of the antenna and the integrated circuit.

* * * * *